(No Model.)
D. A. RIPLEY.
RELOADING TOOL FOR CARTRIDGES.
No. 536,045. Patented Mar. 19, 1895.
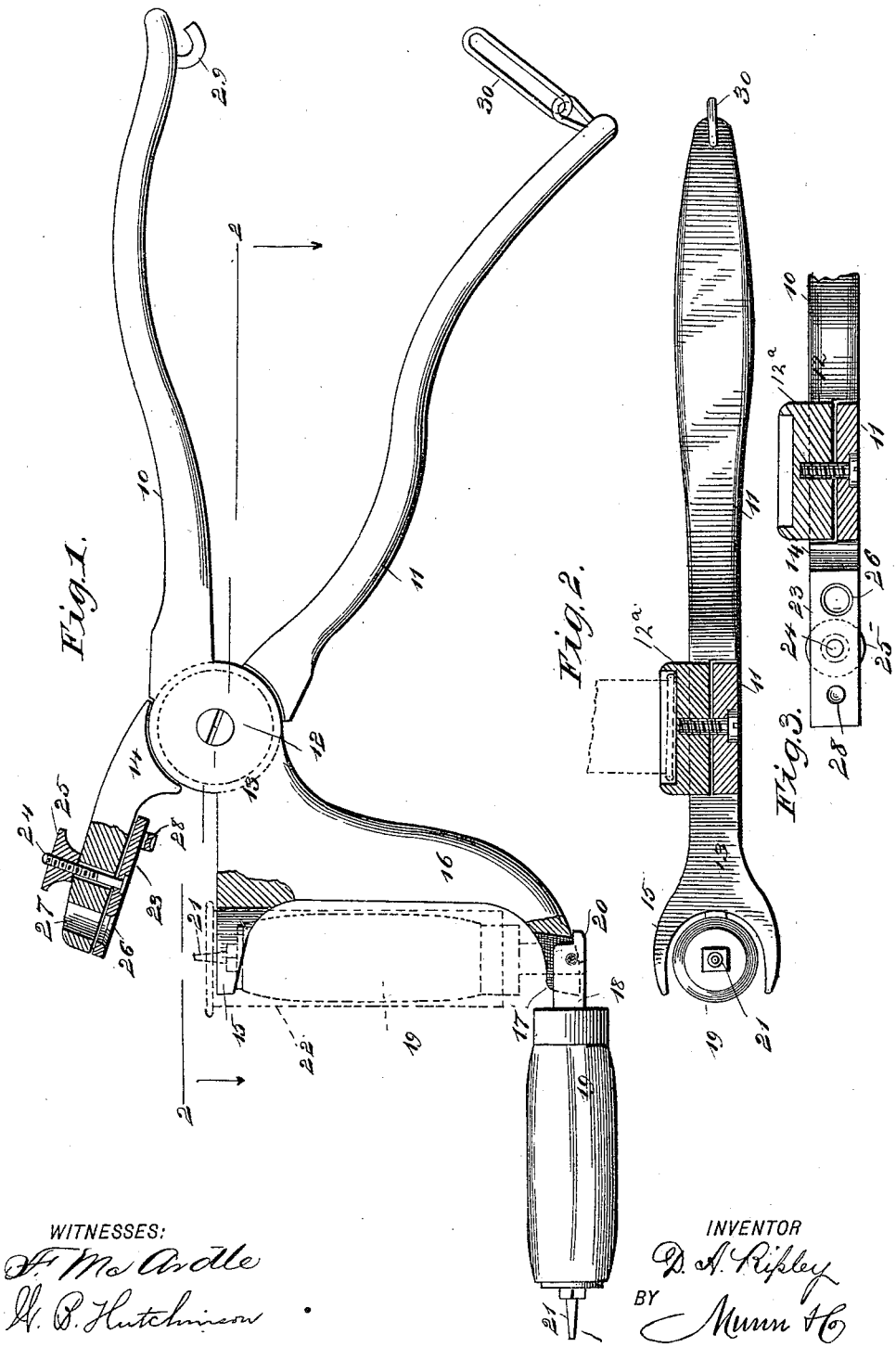
WITNESSES:
INVENTOR
BY
ATTORNEYS.

UNITED STATES PATENT OFFICE.

DAVID AUSTIN RIPLEY, OF CENTRE BELPRE, OHIO, ASSIGNOR TO WILLIAM P. LEWIS, OF SAME PLACE.

RELOADING-TOOL FOR CARTRIDGES.

SPECIFICATION forming part of Letters Patent No. 536,045, dated March 19, 1895.

Application filed July 20, 1894. Serial No. 518,077. (No model.)

*To all whom it may concern:*

Be it known that I, DAVID AUSTIN RIPLEY, of Centre Belpre, in the county of Washington and State of Ohio, have invented a new and Improved Recapping and Decapping Tool for Cartridges, of which the following is a full, clear, and exact description.

My invention relates to improvements in that class of loading tools which are used in the preparation of shells for shot guns and other arms, and particularly to the class of devices used for applying caps to the shells and removing the same therefrom.

The object of the invention is to produce a very inexpensive and simple tool which may be conveniently used, which is adapted to remove the primers from the shells after the same have been fired, and which may also be quickly adjusted so as to adapt it for use in applying new primers or caps to the shells.

To these ends my invention consists in certain features of construction and combinations of parts, as will be hereinafter fully explained and then pointed out in the claims.

Reference is to be had to the accompanying drawings, forming a part of this specification, in which similar figures of reference indicate corresponding parts in all the views.

Figure 1 is a broken side elevation, partly in section, of the tool embodying my invention. Fig. 2 is a sectional plan view on the line 2—2 of Fig. 1; and Fig. 3 is a broken inverted sectional plan, showing the arrangement of the upper jaw and the swivel plate thereon.

The tool is provided with two handles 10 and 11, pivoted together as shown at 12, in the way that ordinary nipper handles are arranged, the member 10 terminating at one end in a thick jaw 13, and the member 11 in a jaw 14 which is adapted to close against the jaw 13. A recessed shell base 12ª is held at the joint 12 and into this a shell may be placed when it is to be reloaded. The lower jaw 13 is widened and forked as shown at 15 in Fig. 2, in order that a cartridge shell may lie within it, and the jaw has a depending forwardly-curved arm 16, the lower end 17 of which is slotted and arranged to come beneath the forked end, so that the shank 18 of the shell holder and guide 19 may be conveniently and centrally pivoted in the arm, and to enable the guide to swing outward and lie parallel with the longitudinal line of the tool, so that a shell may be conveniently placed upon it, the shank has a stop 20, see Fig. 1, which is adapted to strike the lower end of the arm 16, and thus support the guide.

The guide 19 is slightly reduced at the ends, and is of a size to substantially fill a shell, and the guide has at its outer end a punch 21, of a size to enter the priming hole of a shell 22, so that when the shell is forced downward upon the guide, the punch enters the hole and ejects the primer which is held therein.

The upper jaw 14 of the tool is provided with a swivel plate 23, which is held centrally on the under side of the jaw by means of a screw 24, and thumb nut 25, and the swivel plate has near one end a hole 26, which is adapted to register with a hole 27 in the jaw 14, and also with the punch 21, when the latter is turned up into the position shown by dotted lines in Fig. 1, so that the cap or primer ejected by the punch may enter the holes 26 and 27, which thus afford clearance. The plate 23 may be held in the position just described by tightening the thumb nut 25, and by loosening the thumb nut the plate 23 may be turned around so as to bring the boss 28 beneath the hole 27 and above the primer hole of a cartridge, this boss being slightly larger than the primer or cap of the cartridge shell, and having its under side concaved so that it will nicely fit the cap or primer, and be suitable to push the said cap or primer to its seat in the cartridge shell.

In order that the handles of the tool may be held closed when the tool is not in use, one handle is provided with a hook 29 and the other with an engaging link 30. When the tool is used for de-capping shells, the plate 23 is adjusted with the hole 26 registering with the hole 27, and then a shell from which the cap or primer is to be removed is slipped over the guide 19, the latter turned up into a vertical position, as shown by dotted lines in Fig. 1, and the handles 10 and 11 pressed together. This forces the jaws 13 and 14 together, and the punch 21 enters the primer hole of the shell 22, and pushes the cap or primer up into the holes 26 and 27. The guide is then swung down, the shell removed, and the operation repeated with another one.

When the tool is to be used as a re-capper, the plate 23 is adjusted so that the boss 28 comes beneath the hole 27 and above the center of the fork 15. The shell to be re-capped is then placed in the fork 15, the shoulder of the shell resting on the arm of the fork, the cap is placed in the primer hole, and the handles 10 and 11 squeezed as before, thus forcing the boss 28 upon the cap and jamming the latter into its seat.

It will be seen that the tool is extremely simple, that there is nothing about it to get out of order, and that it may be very rapidly used either for de-capping or re-capping shells.

Having thus described my invention, I claim as new and desire to secure by Letters Patent—

1. A re-loading tool, comprising a pair of pivoted jaws, a guide pivoted to one jaw and having a punch at its free end, and a swiveled plate carried by the other jaw and provided with an aperture and a boss, substantially as described.

2. A re-loading tool, comprising a pair of pivoted jaws, one of which is apertured and provided with a boss and the other forked and provided with a forwardly curved depending arm, and a guide pivoted to the said arm and provided with a punch at the free end, substantially as described.

3. A re-loading tool, comprising oppositely arranged handles pivoted together and terminating in opposite jaws, one of which is forked and the other perforated, a depending arm on the forked jaw, a punch pivoted on the arm and adapted to swing into line with the perforation of the opposite jaw, and a swivel plate held on the perforated jaw, the plate having a hole at one end and a boss on the other, substantially as specified.

4. A re-loading tool, comprising a pair of pivoted jaws, one of which is apertured and the other forked and provided with a forwardly curved depending arm, a guide pivoted to the said arm and provided with a punch at its free end, a plate provided with an aperture and a boss, and a screw and thumb nut for adjustably securing the said plate to the apertured jaw, substantially as herein shown and described.

DAVID AUSTIN $\overset{\text{his}}{\underset{\text{mark}}{\times}}$ RIPLEY.

Witnesses:
E. R. BLAKE,
S. R. W. MCFARLAND.